United States Patent [19]
Bellinghausen et al.

[11] Patent Number: 5,347,895
[45] Date of Patent: Sep. 20, 1994

[54] BRAKE LATHE WITH ELECTRONIC FEED CONTROL

[75] Inventors: Thomas G. Bellinghausen, Conway; David R. Coburn, II, Little Rock, both of Ark.

[73] Assignee: FMC Corporation, Chicago, Ill.

[21] Appl. No.: 216,123

[22] Filed: Mar. 22, 1994

Related U.S. Application Data

[63] Continuation of Ser. No. 763,388, Sep. 20, 1991, abandoned.

[51] Int. Cl.$^5$ .......................... B23B 5/02; B23Q 5/28
[52] U.S. Cl. ........................................ 82/112; 82/123; 82/134; 388/806; 388/807; 388/815
[58] Field of Search .......... 82/112, 123, 134; 318/638, 650, 663; 364/474.12; 388/806, 807, 815, 824

[56] References Cited

U.S. PATENT DOCUMENTS

| | | | |
|---|---|---|---|
| 2,688,114 | 8/1954 | Wheeler | 388/807 |
| 2,762,005 | 9/1956 | Harvey et al. | 388/806 |
| 2,911,580 | 11/1959 | Gould et al. | 388/807 |
| 3,229,182 | 1/1966 | Kubler | 388/824 |
| 3,500,589 | 3/1970 | Ellege | 51/132 |
| 3,736,482 | 5/1973 | Brusaglino | 388/807 |
| 4,206,389 | 6/1980 | Snyder | 388/806 |
| 4,471,276 | 9/1984 | Cudlitz | 388/815 |
| 4,506,570 | 3/1985 | Wood | 82/112 |
| 4,578,626 | 3/1986 | Richter | 388/806 |
| 4,745,832 | 5/1988 | Kubik | 82/123 |
| 4,965,848 | 10/1990 | Vasconi et al. | 388/815 |
| 5,003,628 | 3/1991 | Houser et al. | 388/824 |
| 5,040,235 | 8/1991 | Miyazaki | 388/815 |
| 5,095,786 | 3/1992 | Bellinghausen et al. | 82/112 |
| 5,099,728 | 3/1992 | Thiem | 82/112 |

FOREIGN PATENT DOCUMENTS

| | | | |
|---|---|---|---|
| 3432708 | 11/1985 | Fed. Rep. of Germany | 82/112 |
| 2482505 | 11/1981 | France | 82/112 |
| 0005218 | 1/1980 | Japan | 82/123 |
| 1374398 | 2/1988 | U.S.S.R. | 388/806 |

OTHER PUBLICATIONS

*Mark's Standard Handbook for Mechanical Engineers,* 9th ed., E. Avallone and Theodore Baumeister III (editors), p. 15–96 Section 15, p. 30, 1st col.

Primary Examiner—William E. Terrell
Attorney, Agent, or Firm—Henry C. Query, Jr.; Richard B. Megley

[57] ABSTRACT

A brake lathe for truing brake rotors includes a tool holder driven by a direct current motor to move a cutting tool radially with respect to the rotor axis in direct proportion to the number of turns of the drive shaft of the direct current motor. A tool feed power control circuit maintains the direct current motor at constant speed regardless of radial forces acting upon the cutting tool and includes a converter/filter circuit, a regulator circuit, a sensing circuit, and a speed control circuit. A speed selection control includes a rheostat for providing a reference voltage corresponding to a select speed. The sensing circuit compares a voltage drop across the direct current motor to the reference voltage and produces an error voltage. The speed control circuit provides a direct current power voltage to the direct current motor in accordance with the error voltage output of the sensing circuit to maintain operation of the motor at constant speed.

7 Claims, 2 Drawing Sheets

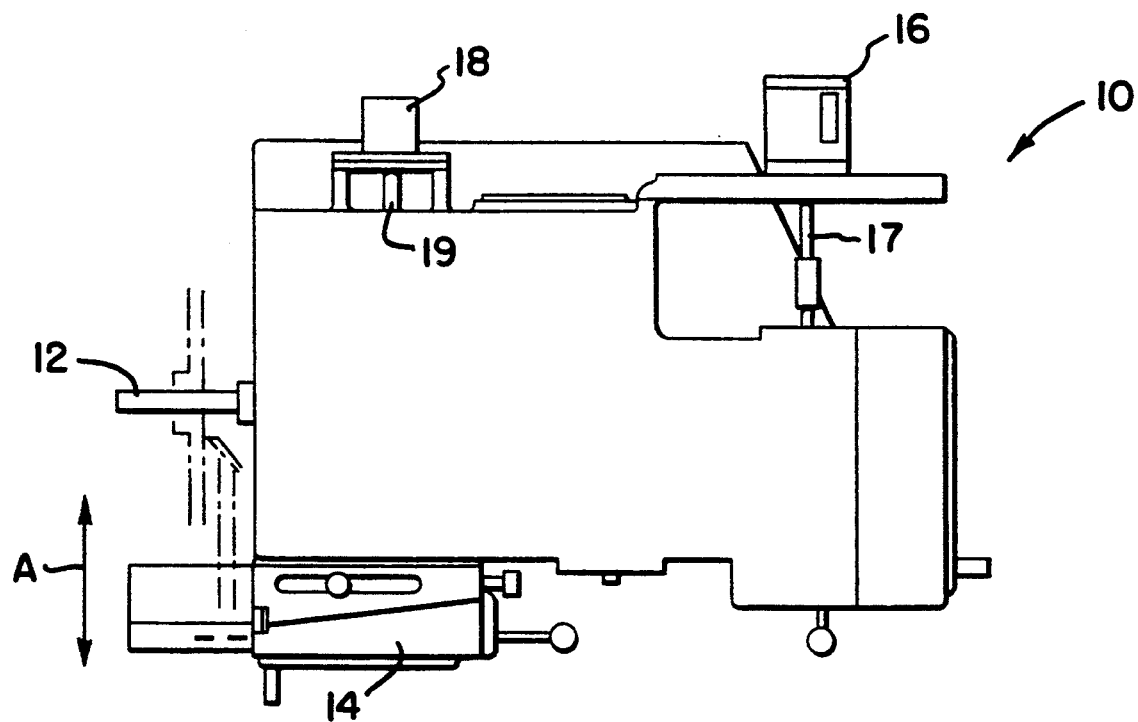
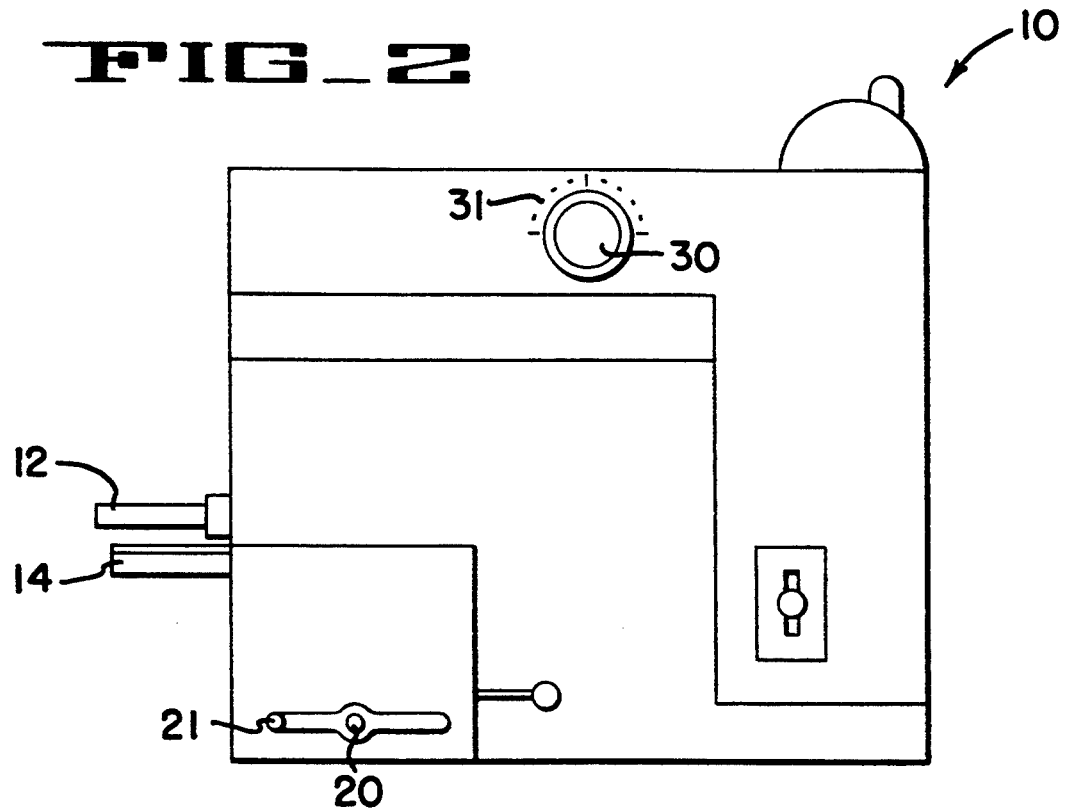

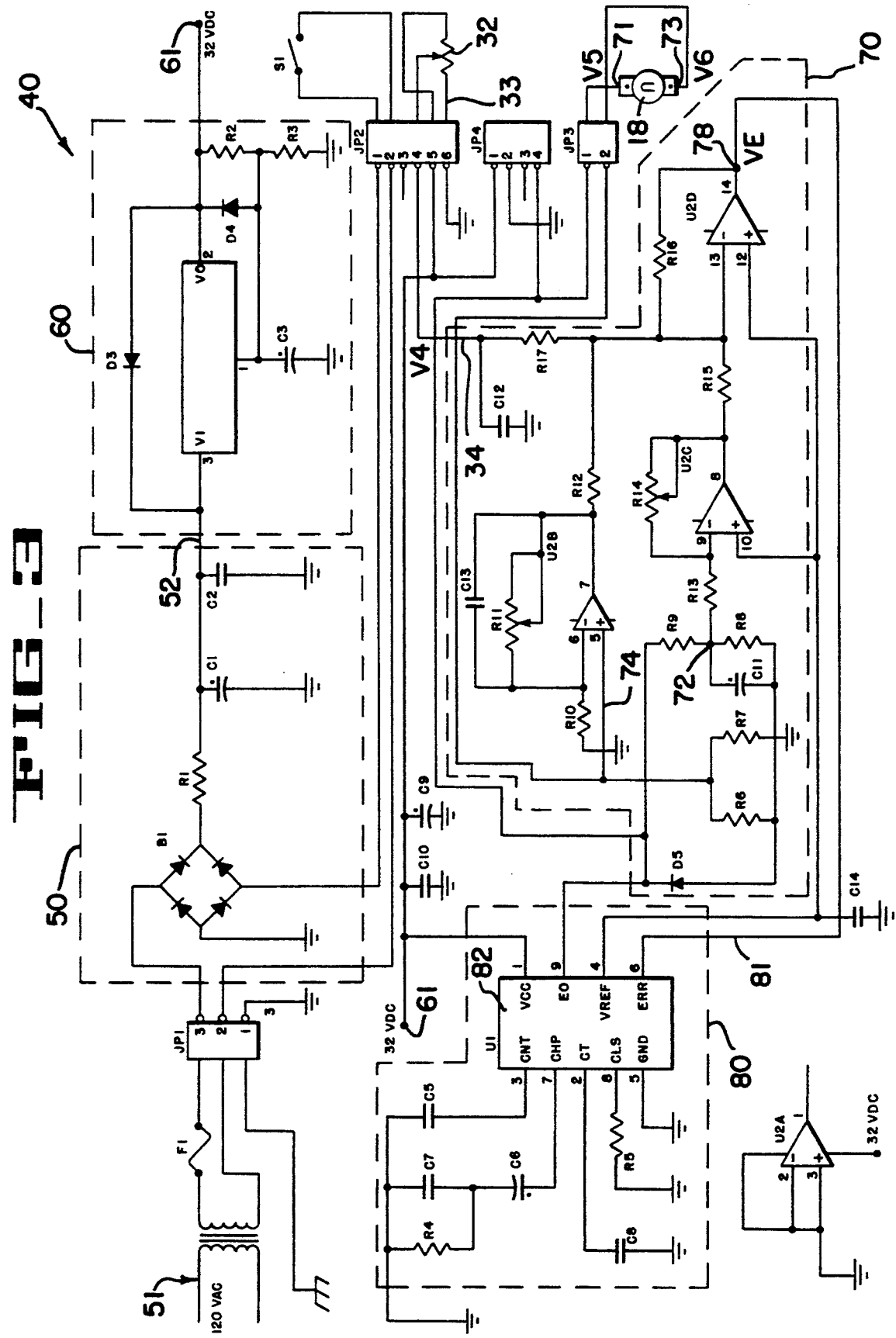

BRAKE LATHE WITH ELECTRONIC FEED CONTROL

This application is a continuation of application Ser. No. 07/763,388, filed Sep. 20, 1991.

FIELD OF THE INVENTION

The present invention relates to brake lathes for truing brake rotors.

BACKGROUND OF THE INVENTION

Brake lathes for truing brake rotors have long been known in the art. Generally, in these devices, a rotor is mounted upon an arbor so that the arbor and rotor may be rotated together about a common axis by an alternating current motor. A tool holder is provided for holding cutting tools in working engagement with a braking surface of the rotor. The tool holder is mounted upon a track which allows it to move translationally to draw the cutting tool progressively across the braking surface of the rotor as the rotor rotates with the arbor during a truing operation. In devices of the prior art, movement of the tool holder has been accomplished by a mechanical drive, such as a worm drive, which is linked to the arbor and alternating current motor by a drive train which may include gears, clutches and the like. While these devices of the prior art have provided for selection of the rate of progression of the cutting tool across the rotor surface by changing gear ratios in the drive train between the arbor drive tool holder drive, the selection of cutting rate has been limited to a small number of fixed rates corresponding to the specific gear ratio combinations made available within the drive train. The gear pairs and clutches of these drive trains of the prior art lathes produce vibration and noise and transmit noise from the arbor to the tool drive which increases the difficulty of achieving a satisfactorily smooth surface during the truing process. In recent years, brake rotors have been made of increasingly diverse materials, making it necessary to provide many different tool progression cutting rates if a lathe is to achieve an acceptable finish on the braking surface of all commercially available rotor products.

BRIEF DESCRIPTION OF THE INVENTION

It is an object of the present invention to provide a brake lathe with a broad range of continuously selectable tool progression cutting rates to allow a high quality surface to be achieved during truing operations on rotors fabricated of a wide variety of materials.

It is a further object of the present invention to provide a brake lathe which produces minimum noise and vibration at the tool-rotor interface.

It is also an object of the present invention to provide a brake lathe which allows a constant cutting width to be maintained as the cutting tool progresses radially across the braking surface of a rotor during a truing operation.

In keeping with the above objectives, a brake lathe according to the present invention includes a direct current motor and a drive train connecting the direct current motor to a tool holder such that a tool held in the tool holder moves radially away from the arbor axis in direct proportion to rotation of the drive shaft of the direct current motor. An electronic tool feed power control circuit is provided for maintaining the speed of rotation of the direct current motor drive shaft at a constant selected speed regardless of radial forces acting upon the cutting tool.

The tool feed power control circuit of the present invention includes a converter/filter circuit, a regulator circuit, a sensing circuit, and a speed control circuit. The converter/filter circuit converts alternating current to direct current and the regulator circuit provides a selected constant direct current output voltage. A speed selection control includes a rheostat and provides a reference voltage corresponding to a selected speed. The sensing circuit compares the absolute value of a voltage drop across the direct current motor to the reference voltage and produces an error voltage output presentative of the difference between the absolute values. The speed control circuit provides a direct current power voltage to the direct current motor and monitors the error output voltage to adjust the power voltage in accordance with variation in motor speed.

BRIEF DESCRIPTION OF THE DRAWINGS

FIG. 1 is a plan view of a brake lathe comprising an embodiment of the present invention.

FIG. 2 is a front plan view of a brake lathe comprising a preferred embodiment of the present invention.

FIG. 3 ice a schematic illustration of an electronic power circuit of a brake lathe comprising a preferred embodiment of the present invention.

DETAILED DESCRIPTION OF THE INVENTION

As shown in FIGS. 1 and 2, brake lathe 10 comprising an exemplary embodiment of the present invention includes arbor 12 and tool holder 14. Arbor 12 is connected to alternating current motor 16 by a drive train, including shaft 17, to rotate arbor 12 at constant speed. The drive train connecting alternating current motor 16 to arbor 12 may also include a clutch and multiple gear pairs to allow arbor 12 to be rotated at different selected constant speeds by alternating current motor 16.

Tool holder 14 is mounted upon a track which allows tool holder 14 to move translationally in a direction perpendicular to the axis of arbor 12, as shown by the doubled headed arrow A in FIG. 1. Direct current motor 18 may drive tool holder 14 outward along path A by means of a tool feed drive train including drive shaft 19, a clutch, and threaded shaft 20, such that tool holder 14 moves outward a distance directly proportional to the number of revolutions turned by drive shaft 19. The speed at which drive shaft 19 of motor 18 turns, and tool holder 14 is driven away from arbor 12, is determined by setting speed control knob 30.

During a rotor truing operation, a brake rotor to be trued is mounted upon arbor 12 as shown in phantom in FIG. 1. The clutch of the feed drive train is disengaged and tool holder 14 is moved inwardly towards arbor 12 by use of crank 21 on the end of threaded shaft 20. A cutting tool, also shown in phantom in FIG. 1, is set at a desired cutting depth to the inside of the breaking surface to be trued. The desired feed rate is set by means of speed control 30 with the assistance of index 31. Alternating current motor 16 is then energized to rotate arbor 12 and the rotor, together, at a constant speed. Direct current motor 18 is then energized to move tool holder 14 and the cutting tool held thereby, away from arbor 12 at constant speed, thus maintaining a constant radial width of cut during the truing operation.

Tool feed power circuit 40 of break lathe 10, shown in FIG. 3, assures that direct current motor 18 continues to operate at a constant speed, in accordance with the setting of speed control knob 30, independent of the magnitude of any radial forces exerted on the cutting tool throughout the truing process. The resistance and capacitance of each of the numbered resistor and capacitor elements of tool feed power circuit 40 is indicated in Table I or II below.

TABLE I

RESISTORS
(In Ohms)

| | | |
|---|---|---|
| $R_1 = 0.56$ | $R_7 = 100$ | $R_{13} = 1,210$ |
| $R_2 = 121$ | $R_8 = 100,000$ | $R_{14} = 500$ |
| $R_3 = 3,300$ | $R_9 = 1,000$ | $R_{15} = 100$ |
| $R_4 = 526$ | $R_{10} = 110$ | $R_{16} = 825$ |
| $R_5 = 1,800$ | $R_{11} = 2,000$ | $R_{17} = 6,810$ |
| $R_6 = 100$ | $R_{12} = 6,810$ | |

TABLE II

CAPACITORS
(In Microfarads)

| | | |
|---|---|---|
| $C_1 = 2,200$ | $C_7 = 0.01$ | $C_{12} = 0.1$ |
| $C_2 = 0.1$ | $C_8 = 0.047$ | $C_{13} = 0.1$ |
| $C_3 = .10$ | $C_9 = 2,200$ | $C_{14} = 0.01$ |
| $C_5 = 0.1$ | $C_{10} = 0.47$ | |
| $C_6 = 1.0$ | $C_{11} = 50$ | |

Tool feed power circuit 40 generally includes four distinguishable subcircuits, as indicated by the dotted boxes of FIG. 3; direct current converter/filter circuit 50, regulator circuit 60, sensing circuit 70, and speed control circuit 80.

Converter/filter circuit 50 of the exemplary embodiment changes incoming alternating current voltage at 51 into a filtered direct current voltage of about 44 volts at 52. Regulator circuit 60 turns the 44 volt direct current input at 52 into a constant 32 volt direct current power source at 61.

Sensing circuit 70 compares a voltage difference, $V_6$ minus $V_5$, across direct current motor 18 with a reference voltage V4 present at 34, which is set by rheostat 32 connected to control knob 30, and which is representative of the speed at which the operator wishes tool holder 14 to advance. In sensor circuit 70, voltage $V_5$, present at 71 and 72, is inverted, or made negative, and then added to $V_6$, present at 73 and 74. The resulting voltage is summed with reference voltage $V_4$ to produce an error indicative voltage VE at 78. As the operator wants direct current motor 18 to run at a speed proportional to $V_4$, according to the setting of rheostat 32 by control knob 30, and the motor is actually running a speed proportional to $V_5$ minus $V_6$, VE is representative of any speed error.

Speed control circuit 80 provides the power voltage to run direct current motor 18 and adjusts the power voltage to compensate for varying loads and maintain constant speed of direct current motor 18. Regulator 82 is a switching regulator with corrective feedback which provides the power voltage to direct current motor 18. Regulator 82 utilizes a pulse width modulation technique to increase or decrease the average power voltage provided to current motor 18 depending upon the voltage applied at pin 6, which is connected to the error voltage output $V_E$ of sensing circuit 70. When error voltage $V_E$ is 0, the output voltage provided by regulator 82 at pin 1 remains constant. If $V_E$, at pin 6, varies from 0, the modulated average voltage provided by regulator 82, at pin 1, is varied accordingly to correct for the variation and maintain operation of direct current motor 18 at constant speed.

Potentiometers $R_{11}$ and $R_{14}$ are provided for feedback adjustment to increase or decrease the sensitivity of tool feed power control circuit 40 to variation in the speed of direct current motor 18, and to dampen the response of tool feed power circuit 40 to changes in the speed of direct current motor 18, respectively. Also, within the limited adjustment permitted by $R_{11}$ and $R_{14}$, and dependent upon the constant speed of arbor 12, the tool feed rate corresponding to settings of control knob 30 relative to index 31 may be calibrated by adjustment of potentiometers $R_{11}$ and $R_{14}$.

We claim:

1. In a brake lathe for truing a brake rotor, the lathe having an arbor upon which a brake rotor can be mounted to rotate with the arbor as a fixed unit about a common axis, an arbor motor for rotating the arbor at a constant speed, and a tool holder for holding a cutting tool with a cutting end of the tool in working relation to a surface of the rotor when the rotor is mounted upon the arbor, the tool holder moveable translationally to move the cutting end of the tool over the surface in a radial direction relative to the common rotational axis, the improvement comprising:

a direct current motor having a drive shaft;
a drive means for causing the tool holder to move translationally in direct proportion to rotation of the drive shaft of the direct current motor;
an electronic power circuit for maintaining a speed of rotation of the direct current motor drive shaft at a constant selected speed;
wherein said electronic power circuit comprises rheostat means for providing a reference voltage corresponding to the constant selected speed; sensing circuit means for determining a voltage drop across said motor, comparing the absolute value of the voltage drop to the absolute value of said reference voltage, and producing an error voltage output representative of a difference between the absolute values; and control circuit means for providing a direct current power voltage to said direct current motor, monitoring said error voltage output, and adjusting said power voltage in accordance with said error voltage;
wherein said power voltage is adjusted utilizing a pulse width modulation technique; and
wherein said control circuit means comprises a switching regulator with corrective feedback.

2. A brake lathe as in claim 1, in which said sensing circuit means comprises a first and second potentiometer means to adjust the magnitude of a change in said error voltage produced in response to a change in the voltage drop and the rate at which said error voltage changes in response to a change in the voltage drop.

3. A brake lathe as in claim 2, further comprising:
converter/filter circuit means for changing an alternating current input voltage into a filtered direct current converter/filter output voltage; and,
regulator circuit means for turning said converter/filter output voltage into a selected constant direct current voltage.

4. A method for moving a tool holder of a brake lathe, in which the tool holder is movable translationally along a tool holder track to move the cutting end of a cutting tool held by the tool holder radially over a surface of a brake rotor mounted upon an arbor of the brake lathe, along the track at a constant selected speed comprising the steps of:
- A. providing a direct current motor having a drive shaft;
- B. providing drive means to cause the tool holder to move translationally along the track in direct proportion to rotational movement of the drive shaft;
- C. energizing the motor by applying an initial direct current power voltage thereto;
- D. measuring a voltage drop across the motor;
- E. comparing the voltage drop to a constant control voltage drop corresponding to the selected speed; and,
- F. increasing, decreasing, or maintaining the level of said power voltage when the voltage drop is less than, greater than, and the same as the control voltage, respectively.

5. In a brake lathe for truing a brake rotor, the lathe having an arbor upon which a brake rotor can be mounted to rotate with the arbor as a fixed unit about a common axis, an arbor motor for rotating the arbor at a constant speed, and a tool holder for holding a cutting tool with a cutting end of the tool in working relation to a surface of the rotor when the rotor is mounted upon the arbor, the tool holder movable translationally to move the cutting end of the tool over the surface of the rotor, the improvement comprising:
- a direct current motor having a drive shaft;
- a drive means for causing the tool holder to move translationally in direct proportion to rotation of the direct current motor drive shaft;
- an electronic power circuit for maintaining a speed of rotation of the direct current motor drive shaft at a constant desired speed;
- rheostat means for providing a reference voltage corresponding to the constant desired speed, said electronic power circuit determining said constant desired speed based on said reference voltage;
- a control knob connected to the rheostat means and having a scale for providing a visual indication of one or more desired speeds; and
- means for calibrating the control knob to the speed of rotation of the direct current motor drive shaft;
- whereby the control knob may be used to select a desired speed.

6. In a brake lathe for truing a brake rotor, the lathe having an arbor upon which a brake rotor can be mounted to rotate with the arbor as a fixed unit about a common axis, an arbor motor for rotating the arbor at a constant speed, and a tool holder for holding a cutting tool with a cutting end of the tool in working relation to a surface of the rotor when the rotor is mounted upon the arbor, the tool holder movable translationally to move the cutting end of the tool over the surface of the rotor, the improvement comprising;
- a direct current motor having a drive shaft;
- a drive means for causing the tool holder to move translationally in direct proportion to rotation of the direct current motor drive shaft;
- an electronic power circuit for maintaining a speed of rotation of the direct current motor drive shaft at a constant selected speed;
- rheostat means for providing a reference voltage corresponding to the constant selected speed;
- means for calibrating the rheostat means to the speed of rotation of the direct current motor drive shaft;
- sensing circuit means for determining a voltage drop across said direct current motor, comparing the absolute value of the voltage drop to the absolute value of said reference voltage, and producing an error voltage output representative of a difference between the absolute values; and
- means for adjusting the response time of the sensing circuit means.

7. A method for moving a tool holder of a brake lathe, in which the tool holder is movable translationally along a tool holder track to move the cutting end of a cutting tool held by the tool holder over a surface of a brake rotor mounted upon an arbor of the brake lathe, along the track at a constant selected speed comprising the steps of:
- A. providing a direct current motor having a drive shaft;
- B. providing drive means to cause the tool holder to move translationally along the track in direct proportion to rotational movement of the drive shaft;
- C. energizing the motor by applying an initial direct current power voltage thereto;
- D. measuring a voltage drop across the motor;
- E. comparing the voltage drop to a control voltage drop corresponding to the selected speed;
- F. increasing, decreasing, or maintaining the level of said power voltage when the voltage drop is less than, greater than, or the same as the control voltage, respectively;
- G. calibrating the speed of rotation of the direct current motor drive shaft to the desired selected speed; and
- H. adjusting the time required to measure the voltage drop across the motor; compare the voltage drop to a control voltage drop corresponding to the selected speed; and increase, decrease or maintain the level of said power voltage when the voltage drop is less than, greater than, or the same as the control voltage, respectively.

* * * * *